Dec. 3, 1963
G. E. GAGNIER
3,112,536
WEATHERSTRIP FASTENER
Filed Aug. 14, 1956
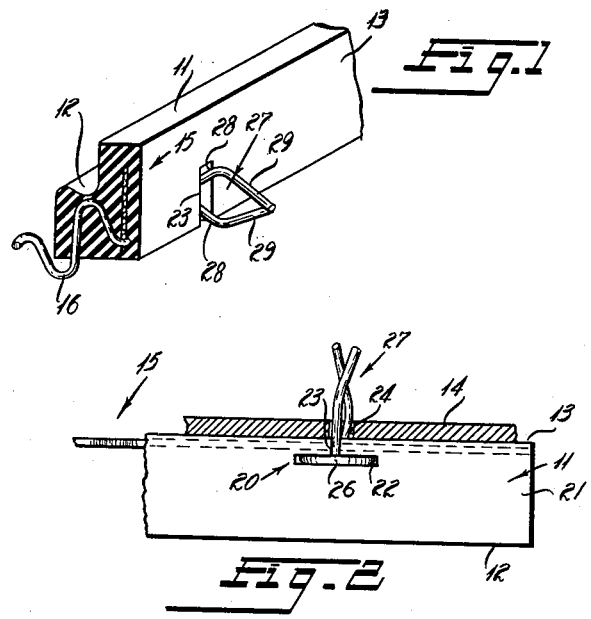
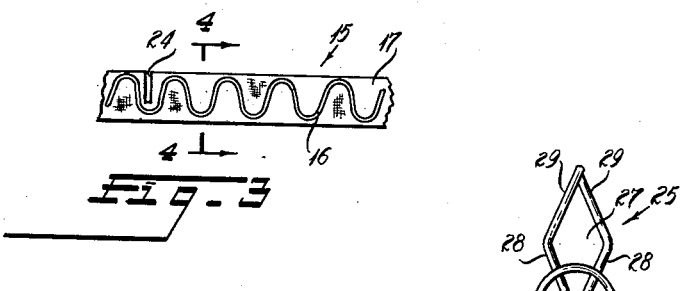
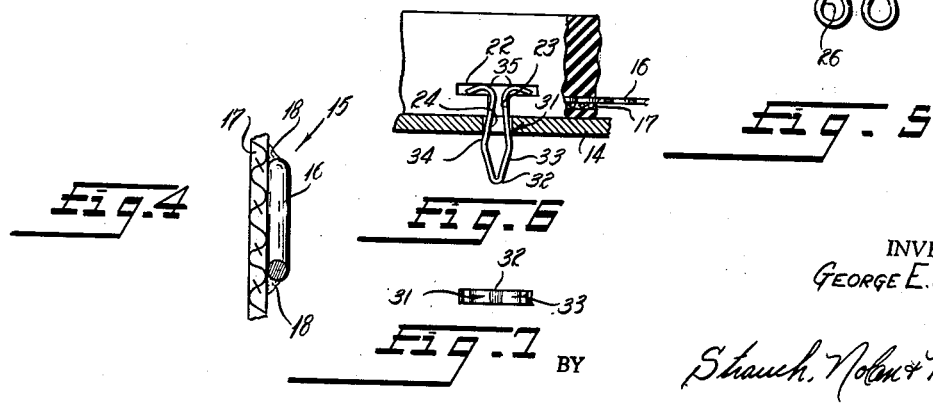
INVENTOR
GEORGE E. GAGNIER
BY Shanch, Nolen & Neale
ATTORNEYS

3,112,536
WEATHERSTRIP FASTENER
George E. Gagnier, Detroit, Mich., assignor to Gagnier Fibre Products Company, Oak Park, Mich., a corporation of Michigan
Filed Aug. 14, 1956, Ser. No. 603,959
1 Claim. (Cl. 20—69)

This invention relates to the snap-on attachment of weatherstrips and like elongated sealing strips of soft rubber or the like to the edges of automobile doors and other rigid support structures.

The invention is particularly concerned with a novel sealing strip construction which may be essentially formed by extrusion molding and is capable of using standard type snap fasteners.

It has been previously proposed to make snap-on weatherstrips for automobile closure members such as in the patents to G. E. Gagnier No. 2,607,965 issued August 26, 1952; G. E. Gagnier No. 2,601,512 issued June 24, 1952; and E. D. Scott No. 2,612,665 issued October 7, 1952 which are representative of prior efforts. In the Gagnier Patent No. 2,607,965, a specially formed length of wire is imbedded along the soft rubber body in the bottom sides and flanges of a T-slot in the body, and conventional snap fasteners have their heads mounted in the T-slot. This requires rather complex forming of the wire, and it has been found that the fastener heads pull out of the T-slots in some installations in spite of the wire reinforcement. Scott discloses one form wherein the sinuous reinforcement is mounted in the bridge of the T-slot and the heads of standard snap fasteners hooked into the wire. This structure has given trouble since the entire assembly of wire and fasteners will pull out of the slot. Scott and Gagnier Patent 2,601,502 also disclose first hooking the fastener heads to the sinuous reinforcing wire or wire mesh and then molding the soft rubber about the assembly but this cannot be done by extrusion molding which increases its cost and furthermore should a fastener shank break or become rusted the whole strip becomes useless.

It is the object of the invention to overcome the foregoing difficulties and provide a novel snap-on weatherstrip wherein an adequately strong longitudinal reinforcement is incorporated and which uses readily attachable and detachable standard snap fasteners.

A further object of the invention is to provide a novel weatherstrip wherein a flat sinuous length of wire combined with a strip of fabric or equivalent is embedded as a longitudinal reinforcing unit in a soft sponge rubber strip suitably recessed for attachment of conventional snap fasteners.

Further objects of the invention will appear as the description proceeds in connection with the appended claims and the annexed drawings wherein:

FIGURE 1 is a perspective cutaway and sectioned view of a section of weatherstrip embodying the invention and having a fastener installed;

FIGURE 2 is a side elevation of the assembly of FIGURE 1;

FIGURE 3 is a plan view of the combined wire and fabric reinforcement unit;

FIGURE 4 is a section on line 4—4 of FIGURE 3;

FIGURE 5 shows a standard type fastener adapted to be used in the invention;

FIGURE 6 illustrates the invention using another form of fastener; and

FIGURE 7 is a top view of the fastener of FIGURE 6.

The elongated weatherstrip comprises a body 11 of soft rubber or equivalent elastomer having a front surface 12 adapted to engage the surface to be sealed and a flat rear surface 13 adapted to seat on the support structure 14.

A reinforcement unit 15 consisting of a length of wire 16 sinuously bent back and forth in a plane and attached upon one surface of a narrow strip 17 of fibrous material such as burlap, canvas, tough paper or even plastic which will be referred to hereinafter and in the claims as a non-metallic tape. Attachment is preferably accomplished by adhesively connecting the sinuous wire along one surface of the tape. The tape may be dipped or coated in adhesive 18 and tightly assembled side by side with the wire until they form a permanent reinforcing unit. Instead of a single sinuous wire at 16 a narrow strip of wire mesh could be used, and both will be collectively known hereafter and in the claims as a length of transverse wire structure.

The strip 11 is formed along its length with a series of transverse slots 20 that are T-shaped in cross-section as they open into one side 21 of the strip with the bridge portion 22 of the T parallel to face 13 and the leg portion 23 opening into surface 13. Slots 20 are substantially normal to the length of strip 11. It is important that the bridge portion 22 of the slot be located forwardly of the embedded reinforceing unit so that the reinforcing unit will be between the head of the fastener and the support 14 in the assembly. The leg portion 23 of the slot which is perpendicular to face 13 extends only part way, slightly more than halfway, across the strip 11 and it is cut through the tape of the reinforcing unit 15 as shown at 24 in FIGURE 3.

Strip 11 is formed along its length with as many of these slots 20 as are needed, each opposite an opening 24 in support plate 14, and they may be automatically formed in the strip sequentially to extrusion.

FIGURE 5 shows a snap fastener 25 of the type disclosed in Place Patent No. 1,679,266 comprising a head 26 from which projects a spring stud 27 consisting of legs having successive diverging holding portions 28 and converging camming portions 29.

In use the fastener 25 is installed in each slot 20 by sliding head 26 into the slot bridge 22, with stud 27 moving transversely through the slot leg 23, whereby the spring stud 27 projects essentially centrally from surface 13. Then with the fasteners installed the studs 27 are pushed through openings 24 and the holding portions 28 resiliently bear on the inner edge of the hole to maintain the strip 11 on the support 14.

The novel reinforcement unit prevents any longitudinal stretching of the soft rubber strip 11 but permits the strip to readily bend around curves or corners, and it is strong enough to prevent the head 26 from being pulled out through surface 13. Moreover should a fastener 25 become broken, it is readily replaced. The assembly with the support structure is speedy and certain and the action of the inclined spring stud holding arms 28 pulls the strip 11 tight with support 14 and seals opening 24 against entry of dirt or water.

Any suitable headed snap fasteners may be used in slots 20, and if desired the bridge 22 of slots 20 may be made concave toward the face 13 and the fastener heads similarly shaped for improved holding.

In FIGURE 6 a different fastener 31 is used in slot 20. This fastener is made from a single length of flat stock bent to provide a closed nose 32, diverging leg portions 33 and converging leg portions 34 that engage the edges of hole 24 in the assembly. The legs terminate in a head portion formed by oppositely outwardly bent arcuate arms 35 which are disposed in bridge 22 of the slot so that in the assembly the fastener head is clenched within the slot bridge on the opposite side of reinforcement 15 from the support 14.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A reinforced weatherstrip assembly comprising an elongated body of soft deformable elastomer having a sealing surface, a support engaging surface and a side surface all extending longitudinally, a reinforcing unit consisting of a non-metallic tape bonded in side by side relation along a length of transverse wire structure, said unit being embedded wholly in and substantially parallel to said support engaging surface, and fastener attachment means comprising a plurality of longitudinally spaced transverse slots extending in from said side surface and opening into said support engaging surface and having fastener head receiving portions located on the side of said reinforcing unit opposite said support engaging surface, said unit being formed by adhesively bonding said tape and wire structure together, and said body being molded about said unit.

References Cited in the file of this patent

UNITED STATES PATENTS

| | | |
|---|---|---|
| 1,940,969 | Randall | Dec. 26, 1933 |
| 1,978,326 | Reid | Oct. 23, 1934 |
| 2,070,839 | Place | Feb. 16, 1937 |
| 2,153,484 | Schemmel | Apr. 4, 1939 |
| 2,187,505 | Tea | Jan. 16, 1940 |
| 2,601,512 | Gagnier | June 24, 1952 |
| 2,612,665 | Scott | Oct. 7, 1952 |
| 2,636,835 | Boulware et al. | Apr. 28, 1953 |
| 2,638,642 | Spraragen | May 19, 1953 |